United States Patent
Insalaco et al.

(10) Patent No.: US 6,279,395 B1
(45) Date of Patent: Aug. 28, 2001

(54) ANNUAL SHEAR ELEMENT WITH RADIAL PRELOAD

(75) Inventors: Michael D. Insalaco, Niagara Falls; Jeffrey M. Schnellinger, Akron; Andrew Crawford, Tonawanda, all of NY (US)

(73) Assignee: Kistler Instrument Corporation, Amherst, NY (US)

( * ) Notice: Subject to any disclaimer, the term of this patent is extended or adjusted under 35 U.S.C. 154(b) by 0 days.

(21) Appl. No.: 09/418,256

(22) Filed: Oct. 15, 1999

Related U.S. Application Data
(60) Provisional application No. 60/118,815, filed on Feb. 5, 1999.

(51) Int. Cl.$^7$ .................................................. G01F 15/09
(52) U.S. Cl. .................. 73/514.34; 73/727; 73/862.381; 310/329; 310/338; 310/369
(58) Field of Search .......................... 73/514.34, 514.01, 73/514.16, 715, 723, 726, 727, 862.581, 862.381, 862.621, 862.625, 862.627, 862.629, DIG. 4; 310/329, 333, 338, 369

(56) References Cited

U.S. PATENT DOCUMENTS

| | | | |
|---|---|---|---|
| 4,359,658 | * 11/1982 | Carter | 310/329 |
| 4,503,351 | 3/1985 | Sonderegger et al. | |
| 5,408,878 | * 4/1995 | Lysen | 73/514.34 |
| 5,777,239 | * 7/1998 | Fuglewicz | 73/862.68 |

* cited by examiner

Primary Examiner—Richard A. Moller
(74) Attorney, Agent, or Firm—Barnes & Thornburg

(57) ABSTRACT

A sensor including a center post extending along the sensing axis of the sensor, a piezoelectric sensing element concentrically engaging the center post, and a preload element preloading the piezoelectric element radially outward to the axis. The center post includes a recess along the axis and the first preload element is in the recess and preloads the piezoelectric element radially outward. The sensor may include a mass concentrically engaging the piezoelectric element. The sensor senses acceleration, force or pressure.

13 Claims, 7 Drawing Sheets

ANNUAL SHEAR ELEMENT WITH RADIAL PRELOAD

CROSS REFERENCE

This application claims the benefit of U.S. Provisional Patent Application No. 60/118,815 filed Feb. 5, 1999 which is incorporated herein by reference.

BACKGROUND AND SUMMARY OF THE INVENTION

The present invention relates generally to piezoelectric transducers and sensors that measure acceleration, force, and pressure, and more specifically to a new method and structure for radially preloading an annular piezoelectric element of an accelerometer, force transducer or sensor, or pressure transducer or sensor.

Piezoelectric transducer and sensor designs have progressed significantly in recent years and have evolved from those which use natural piezoelectric crystals into designs which incorporate man made and electrically polled ceramic materials. Natural crystals are cut along specific planes and the resulting plate produces an electrical output when stressed either compressively or in shear as dictated by the particular crystallographic orientation of the cut. Incorporating shear cut plates into designs yields a transducer or sensor which is extremely insensitive to strains typically induced by base bending or thermal gradient exposure.

An example of a planar shear design accelerometer is shown in FIG. 1 and the sensing material can be either natural crystal or piezoelectric ceramic 12. A compressive stress is imposed on the sensing element by the tightened preload bolt 16, 18 and frictional forces are then present at all interfaces. Acceleration normal to the mounting base 10 imposes a shear stress on the sensing element and an electrical output is generated. The seismic system constructed from the two end masses 14 and center preload bolt 16, 18 is essentially isolated from any base distortion.

The man made ceramic piezoelectric elements can be fabricated in a variety of shapes and a tube form has been incorporated into many accelerometer designs. Tubes are electrically poled similar to ceramic shear plates and an ideally symmetric seismic system can be achieved. The components within this annular shear type accelerometer are relatively inexpensive to manufacture due to their simple, round, shape. An example of an annular shear accelerometer is shown in FIGS. 2 and 3. The support 20 is cylindrical and receives the cylindrical sensing element 22 and mass 24.

Attachment of the tube to the central mounting post is accomplished using a variety of methods. Epoxy attachment is very common but unreliable. Another approach uses ultra precise mated parts which are assembled after the post is cooled and the ring/mass is heated. When equilibrium returns, a preloaded assembly is achieved. This approach provides an excellent mechanical preload but is limited to a restricted usable temperature range. This approach also adds additional cost to accelerometer fabrication. An example is illustrated in U.S. Pat. No. 4,503,351.

The present transducer includes a center post extending along the sensing axis of the transducer. A piezoelectric sensing element concentrically engages the center post and extends along the axis. A mass concentrically engages the piezoelectric element and also extends along the axis. At least a first preload element preloads the piezoelectric element radially to the axis. In one embodiment, the center post includes a recess along the axis and the first preload element is in the recess and preloads the piezoelectric element radially outward.

The preload element may be a cylindrical spring. Also, the preload element in the recess of the center support may also be a solid element pressed fit into the recess to create the radially outward preload or may be a tapered element adjustably positioned into the recess to adjustably create the radial preload. Preferably, the center support of the piezoelectric element and the mass are cylindrical. Other shapes may be used.

The center support may extend from a base and an outer support spaced from the center support may also extend from the base and form therewith an annular recess in which the piezoelectric element and mass lie. Also, the mass may include a radial flange extending radially inward and over the piezoelectric element. Preferably, the piezoelectric element is a shear piezoelectric element which has a shear axis parallel to the accelerometer axis.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
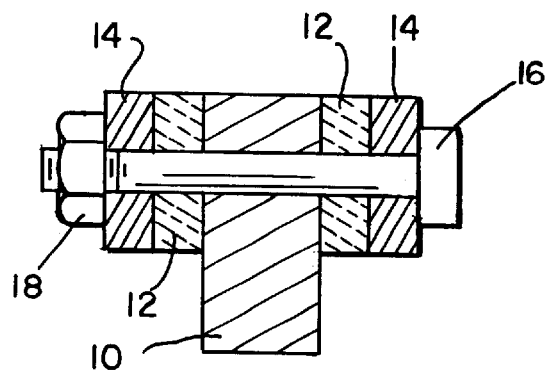
FIG. 1 cross sectional view of a planar shear accelerometer of the prior art.
Figure 2:
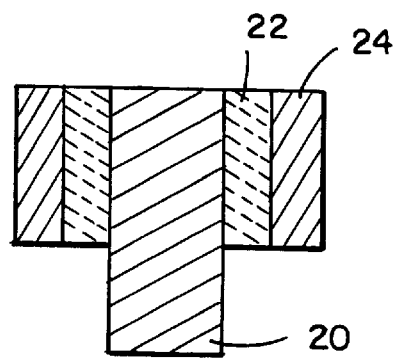
FIG. 2 is a cross sectional view of an annular shear accelerometer of the prior art taken along lines II—II of FIG. 3.
Figure 3:
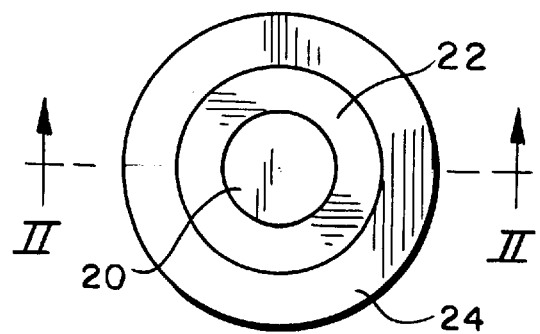
FIG. 3 a top view of the annular shear accelerometer of FIG. 2.
Figure 5:
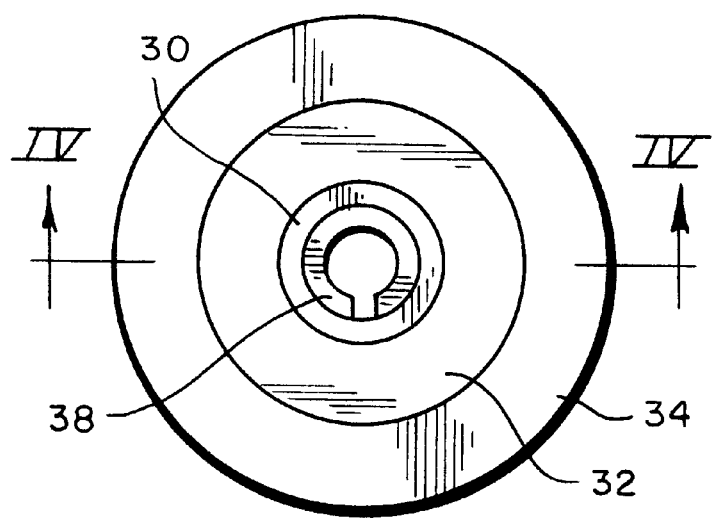
FIG. 5 is a plan view of the shear accelerometer of FIG. 4.
Figure 4:
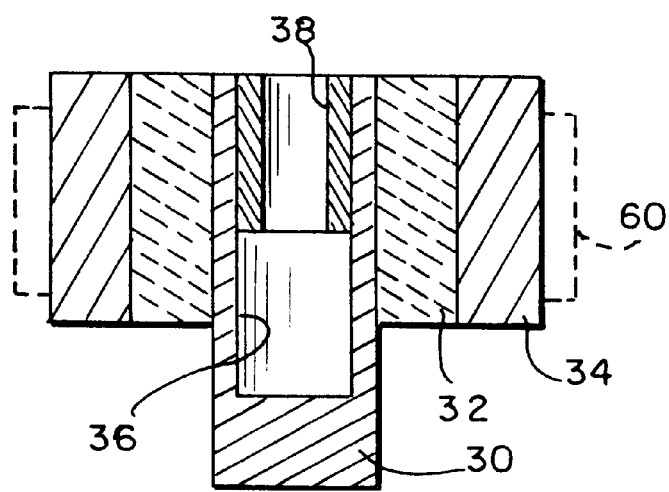
FIG. 4 is a cross sectional view of an accelerometer according to the principles of the present invention taken along lines IV—IV of FIG. 5.

One embodiment of the piezoelectric accelerometer is illustrated in FIGS. 4 and 5. The support 30 is generally cylindrical and includes a piezoelectric element 32 concentrically engaging the center support 30 and extending along the longitudinal axis of the support 30. This longitudinal axis is the sensing axis of the accelerometer. A mass 34 concentrically engages the piezoelectric element 32 and also extends along the axis. The center support 30 includes a recess 36 in which is inserted a preloading element 38. The preloading element 38 is shown as a spring which provides radially outward the extending forces which cause the walls of the recess 36 to expand and radially compressing the piezoelectric element 32 against the mass 34. The walls of the recess 36 are sufficiently thin such that the spring 38 can flex the walls to create the radial preloading force.

Figure 6:
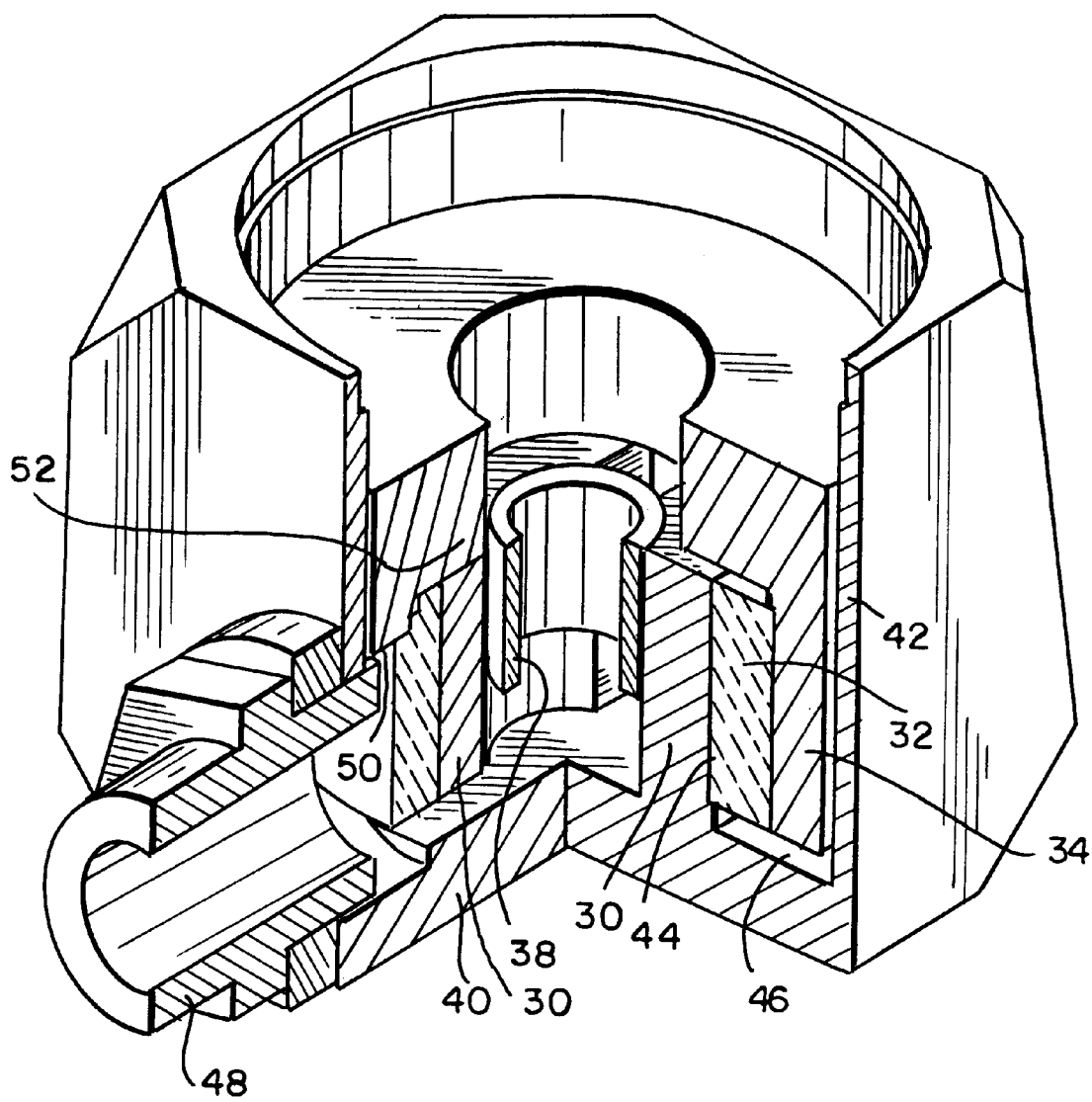
FIG. 6 is a perspective cut-away of the shear accelerometer similar to that of FIG. 4 in a housing structure.

The mounting of the accelerometer in FIG. 4 into an exemplary housing is illustrated in FIG. 6. The center support 30 extends from and can be integral with a base 40. An outer wall 42 spaced from the center support 30 also extends from and can be integral with the base 40 and forms a recess 44 there between. The piezoelectric element 32 and the mass 34 are received in the recess 44. A trench or well 46 in the base of the recess 44 receives the electrical cables or connections to the piezoelectric element 32. These wires are then connected to an outlet cable 48. The mass 34 includes an opening 50 to accommodate the internal termination of the cable 48. Also, as illustrated in FIG. 6, the mass 32 may include a radial flange 52 extending over the top of the piezoelectric element 44.

Another method of providing additional radial compression includes preload element 60, shown in phantom in FIG. 4, concentrically engages the mass 34 and preloads the piezoelectric element 32 radially inward. The force exerted by the preload element 60 presses the mass 34 against the piezoelectric element 32 and the center support 30.

Figure 7:
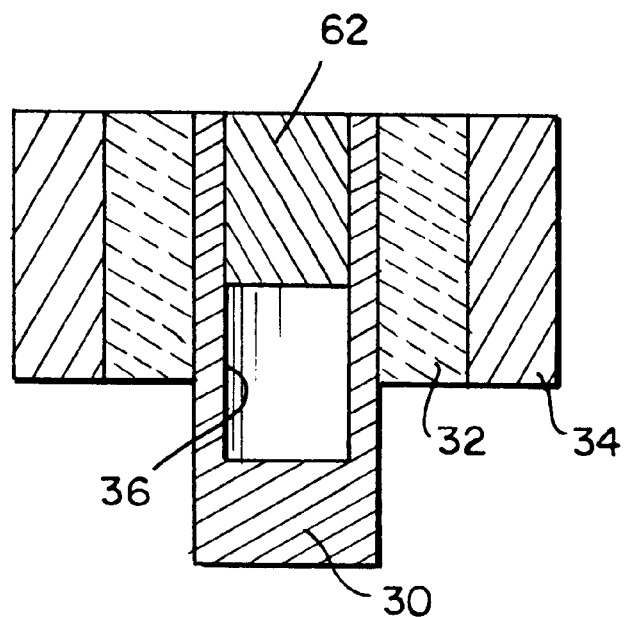
FIG. 7 is a cross sectional view of another embodiment of the shear accelerometer according to the principles of the present invention.

As a further alternative, a preload element 62 is shown in FIG. 7 as a solid element which is press fit in the recess 36. As it is inserted, it flexes the walls of the recess 36 radially outward and places the piezoelectric element 32 in preload just as the spring 38 does in FIGS. 4 and 5.

Figure 8:
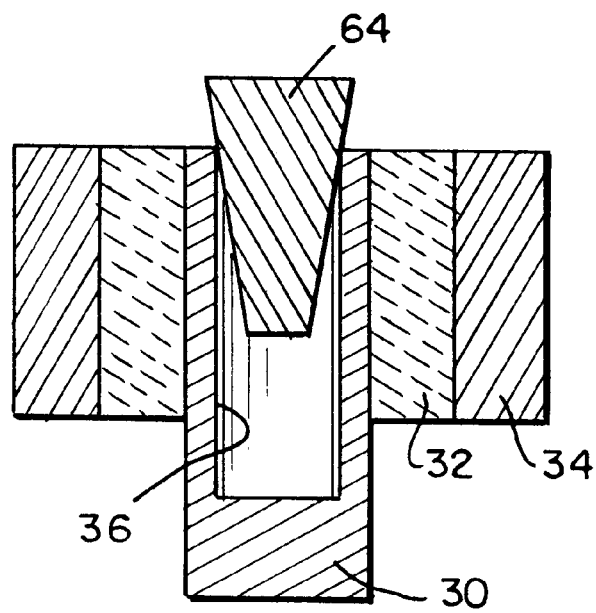
FIG. 8 is a cross sectional view of another embodiment of the shear accelerometer according to the principles of the present invention.

To provide an adjustable preloading, a tapered element 64, as illustrated in FIG. 8, can be inserted in the recess 36. The depth of the element 64 will determine the amount of preloading. It should be noted that instead of a continuous taper as shown, the taper can be a series of stepped elements. It should also be noted that the taper may be a threaded element which could be received in the recess 36. Again, the center preload element 62 and 64 of FIGS. 7 and 8 may be used in combination with the exterior preload element 60 of FIG. 4.

Figure 9:
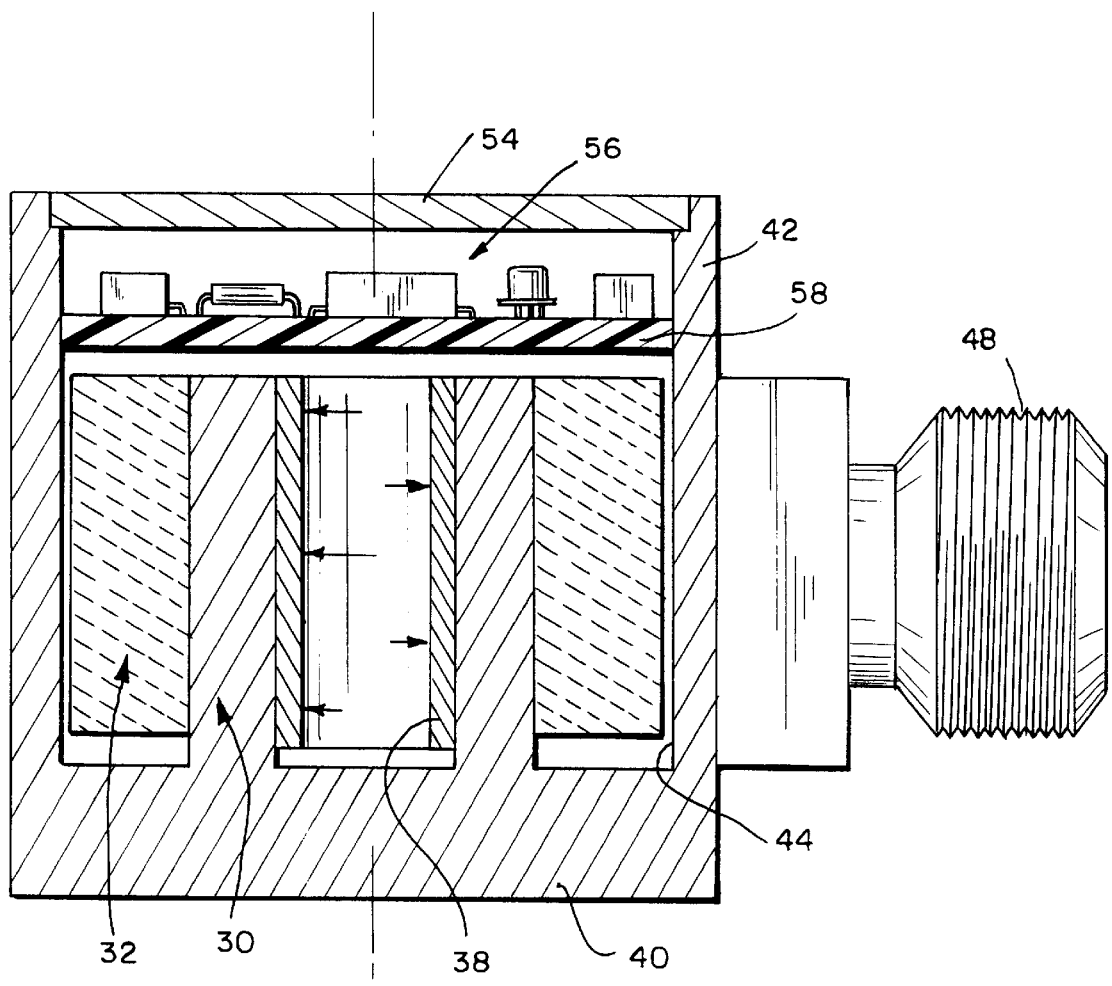
FIG. 9 is a cross sectional view of another embodiment of the shear accelerometer according to the principles of the present invention.

As a further alternative, the piezoelectric element 32 and the mass 34 of FIG. 8 may be combined as a single element as illustrated in FIG. 9. Thus, the piezoelectric element 32 serves as both a sensing element and the mass of the accelerometer. The housing is also shown as including a top wall 54 welded in place to the side walls 42. Also, electronics 56 are shown mounted interior to the housing on a board 58. The electronic 56 may include preamplification and/or other signal processing before being transmitted through outlet cable 48.

Figure 10:
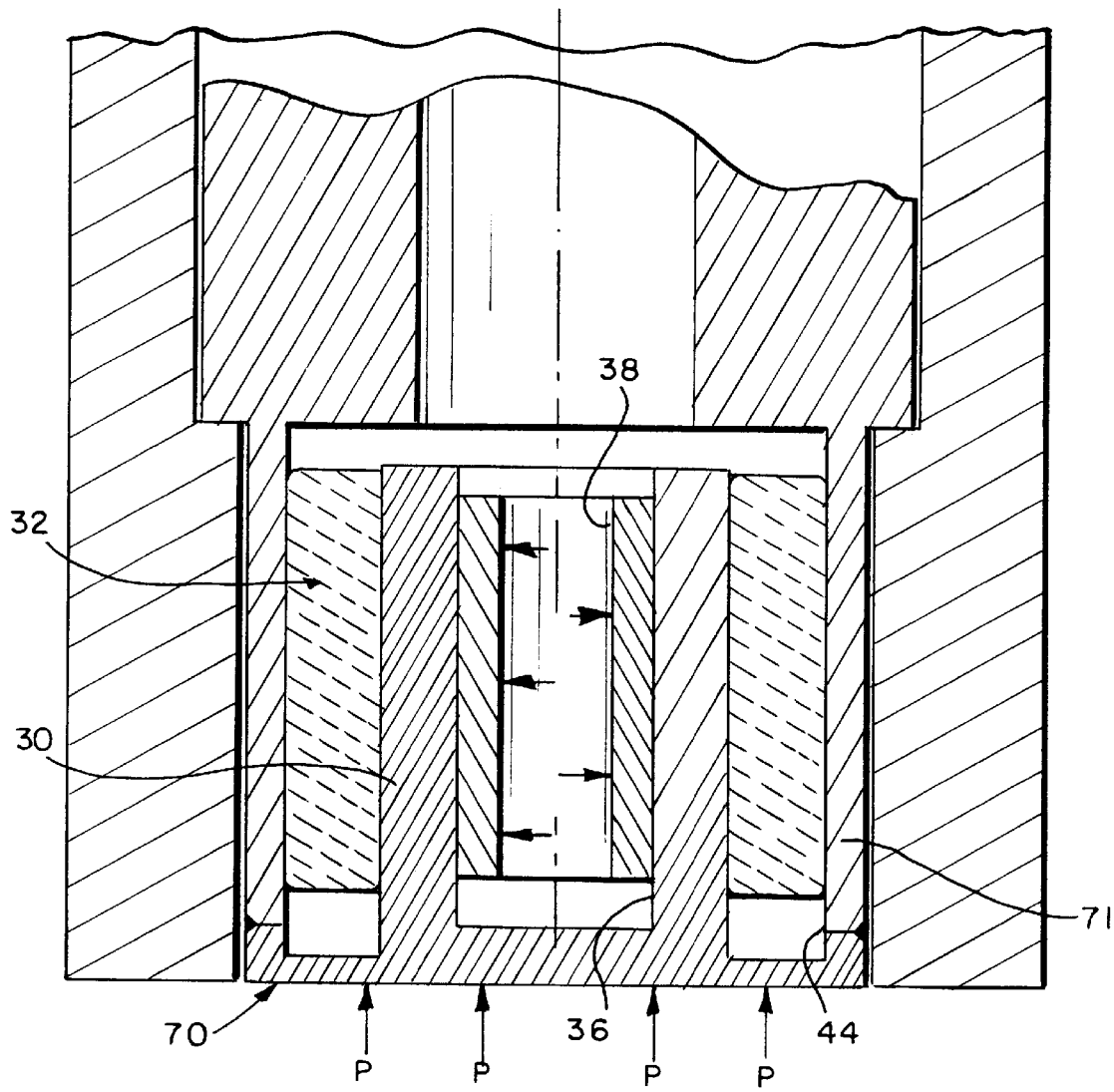
FIG. 10 is a cross sectional view of a pressure transducer according to the principles of the invention.

The present principles of the invention may also be used in a pressure sensor as illustrated in FIG. 10. The central support 30 is connected and an integral part of a diaphragm 70 which receives the pressure to be monitored. Side walls 71 are welded to the diaphragm 70. The piezoelectric element 32 is in the recess 44 and the preloading element 38 is interior in recess 36. The diaphragm 70 deflection stresses the piezoelectric material 32 of the pressure sensor in the same manner that a mass stresses an accelerometer.

Figure 11:
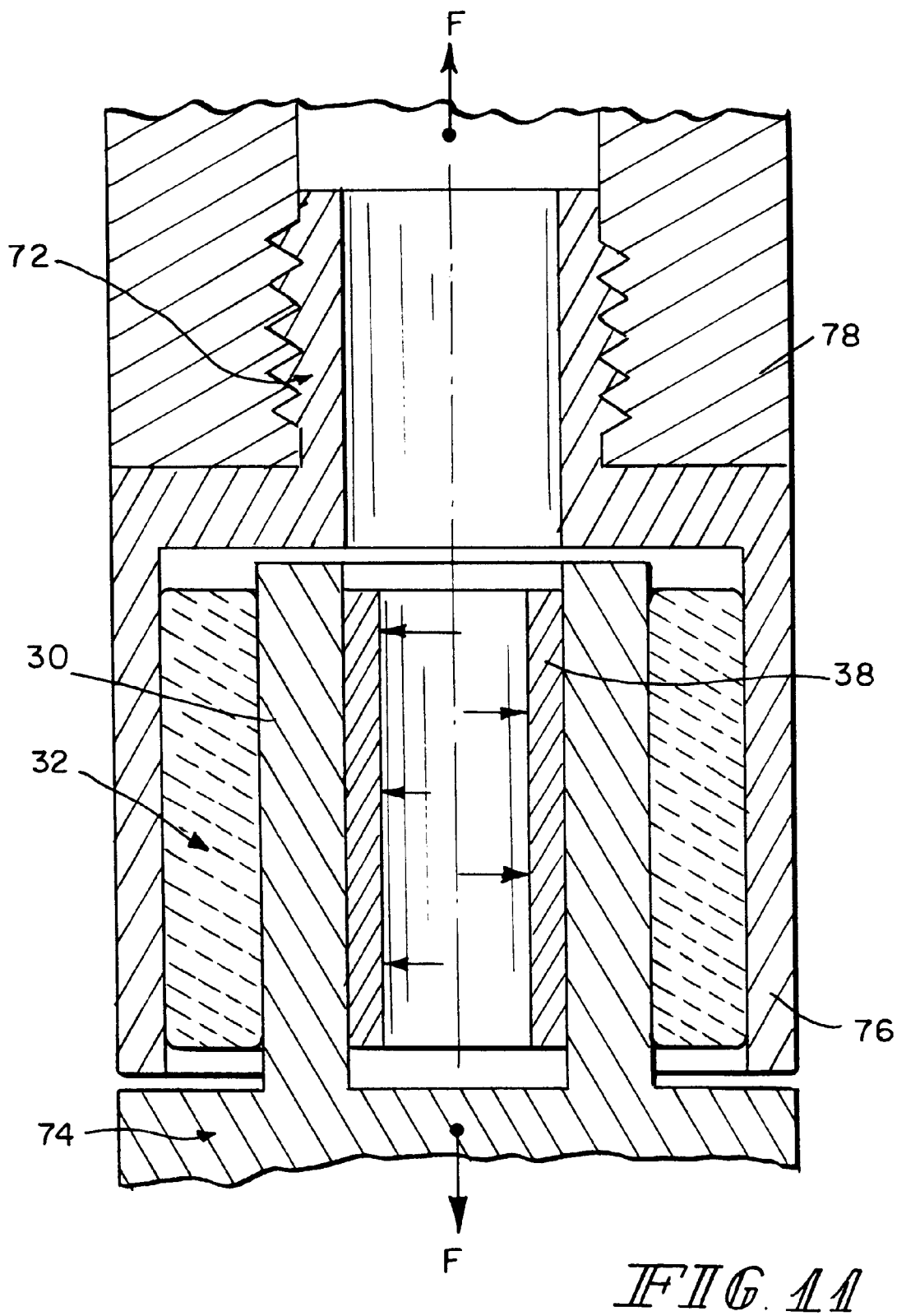
FIG. 11 is a cross sectional view of a force transducer according to the principles of the invention.

Another embodiment of a force sensor incorporating the principles of the present invention is illustrated in FIG. 11. The piezoelectric element 32 rests between wall 30, which is integral with a first force element 74, and wall 76 of second force element 72, which is threadably received in or otherwise attached to a structure 78. Preloading element 38 provides the preload on the piezoelectric element 32. The forces on elements 74 and 72 exert shear stress on the piezoelectric element 32.

Preferably, the piezoelectric elements are shear piezoelectric elements having their shear sense of direction parallel to the longitudinal axis or sensing axis of the sensor.

As can be seen, the mechanical preloading device which produces radial preloading is essentially easy to assemble and does not have a restricted temperature range in which it can be used.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A sensor for sensing acceleration, pressure or force along an axis comprising:

a center support including a recess extending along the axis;

a piezoelectric element concentrically engaging the center support and extending along the axis;

a preload element in the recess and preloading the piezoelectric element radially outward to the axis.

2. A sensor according to claim 1, wherein the preload element is a spring.

3. A sensor according to claim 1, wherein the preload element is a solid element press fitted into the recess.

4. A sensor according to claim 1, wherein the preload element is a tapered element adjustably positioned in the recess.

5. A sensor according to claim 1 wherein the center support, the piezoelectric element and the preload element are substantially cylindrical.

6. A sensor according to claim 1, including a mass concentrically engaging the piezoelectric element and extending along the axis.

7. A sensor according to claim 6, wherein the center support, the piezoelectric element, the mass and the preload element are substantially cylindrical.

8. A sensor according to claim 6, wherein the center support extends from a base and an outer wall spaced from the center support and extending from the base forms an annular recess in which the piezoelectric element and mass lie.

9. A sensor according to claim 6, wherein the mass includes a radial flange extending radially inward and over the piezoelectric element.

10. A sensor according to claim 6, wherein the center support, the piezoelectric element and the mass are substantially cylindrical.

11. A sensor according to claim 1, wherein the piezoelectric element is a shear piezoelectric element with its shear axis parallel to the accelerated axis.

12. A sensor according to claim 1, wherein the center support extends from a diaphragm which receives pressure to be sensed; including an outer wall spaced from the center support; and the base and the preload element loading the piezoelectric element between the center support and the outer wall.

13. A sensor according to claim 1, wherein the center support extends from a base; including an outer wall spaced from the center support and the base, and the preload element loading the piezoelectric element between the center support and the outer wall.

* * * * *

UNITED STATES PATENT AND TRADEMARK OFFICE
CERTIFICATE OF CORRECTION

PATENT NO.    : 6,279,395 B1                                              Page 1 of 1
DATED         : August 8, 2001
INVENTOR(S)   : Michael D. Insalaco, Jeffrey M. Schnellinger and Andrew Crawford It is certified that error appears in the above-identified patent and that said Letters Patent is hereby corrected as shown below:

<u>Title page,</u>
Item [54], title, change "ANNUAL" to -- ANNULAR --.

Signed and Sealed this

Twenty-third Day of July, 2002

*Attest:*

*Attesting Officer*

JAMES E. ROGAN
*Director of the United States Patent and Trademark Office*